T. B. McCONAUGHEY.
Corn-Planter.
No. 224,099.  Patented Feb. 3, 1880.
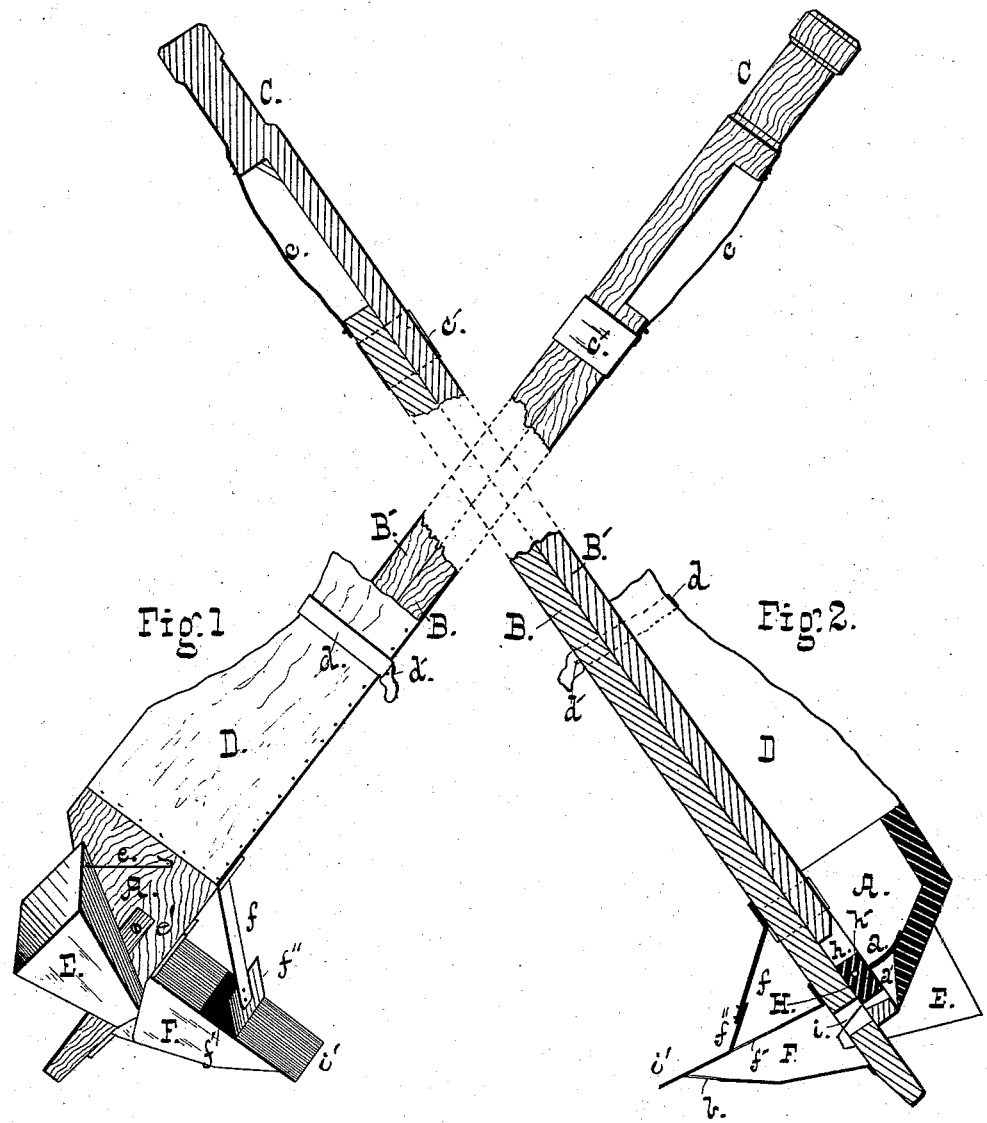

UNITED STATES PATENT OFFICE.

THOMAS B. McCONAUGHEY, OF NEWARK, DELAWARE.

CORN-PLANTER.

SPECIFICATION forming part of Letters Patent No. 224,099, dated February 3, 1880.

Application filed July 15, 1879.

*To all whom it may concern:*

Be it known that I, THOMAS B. MCCON-AUGHEY, of Newark, New Castle county, State of Delaware, have invented certain new and useful Improvements in Corn-Planters; and I hereby declare the same to be fully, clearly, and exactly described as follows, reference being had to the accompanying drawings, in which—

Figure 1 is a perspective view, and Fig. 2 a vertical longitudinal sectional view, of the device.

My present invention relates to what are known as "hand corn-planters;" and it consists in certain improvements upon the devices of the same general class patented to me.

In the accompanying drawings, A is the seed-hopper, which is secured to a rod, B, and is provided with a top, D, of textile fabric, adapted to be collapsed at its upper end by means of a strap, $d$, that is secured by a button, $d'$, on the rod B, the object being to prevent the seed from being thrown out as the device is struck into the ground.

Upon the bar B slides the feed-bar B', which is slotted at the part which is normally within the hopper. In this slot $h$ is pivoted eccentrically, as shown at $h$, a reversible block, H, the space between the upper end of the slot and this block constituting the seed-cup, whose size may be altered by reversing the block, as will be readily understood. The bar B' slides in guides $c'$ and terminates in a handle, C. A strap, $c$, prevents its withdrawal beyond a certain distance.

An opening, $i$, is formed in the bar B, and beneath it is firmly bolted to the bar a wedge-shaped box, F, terminating in a hoe-blade, $i'$. The front of the box is open at $f'$, and to the part $f''$ is riveted a brace, $f$, that is bolted to the bar B. At the bottom of the box F is an opening, $b$, for the discharge of the seed.

Within the hopper A is a lip, $a$, preferably of india-rubber, which strikes the seed-cup as it passes thereunder, and beyond this lip is a cavity, $a'$, for the reception of the grain or two of seed that might pass as the cup passes under the lip, and which might otherwise jam the device and prevent the proper motion of the bar B'.

E is a funnel or hopper, which is removably attached, as shown at $e\ e'$, to the side of the hopper A, and opens into the box F. It is designed to distribute fertilizer in the hills, being supplied by an attendant, who tosses a small portion of fertilizer into the funnel as the device is struck into the ground by the person using it.

In operation, the position of the block H being adjusted so that the seed-cup shall hold the proper quantity of seed, the hopper A is filled, the handle C being withdrawn, as shown in the figures of drawings. The device is struck into the ground after the manner of a hoe, when the handle C is depressed, causing the seed-cup to pass under the lip $a$ and occupy a position over the orifice $i$, through which latter the seed falls into the box F, and therefrom into the ground.

The dropping of the seed is made apparent to the person using the device in two ways: He hears it strike the rear side of the box F, and sees it pass the opening $f'$, thus enabling him to apprehend the fact should the hopper be exhausted, or the device get out of order in any way so as to cease to feed the seed in the desired manner.

What I claim is—

1. In combination with the slotted bar B', the reversible block H, eccentrically pivoted, as set forth.

2. The combination, with the hopper A and feed-bar B', having reversible block H, of the box F, having hoe-blade $i'$, and funnel E, as and for the purpose set forth.

THOS. B. McCONAUGHEY.

Witnesses:
GEO. W. LINDSEY,
GEORGE W. WILLIAMS.